United States Patent [19]

Morris et al.

[11] 3,804,653

[45] Apr. 16, 1974

[54] ADHESIVE

[75] Inventors: Horton Harold Morris, Macon; Richard Jacob Drexel, Jr., Irwinton; Kenneth Lamar Turner, Gordon, all of Ga.

[73] Assignee: Freeport Minerals Company, New York, N.Y.

[22] Filed: Feb. 25, 1970

[21] Appl. No.: 14,244

Related U.S. Application Data

[63] Continuation-in-part of Ser. No. 817,258, April 10, 1969, abandoned, which is a continuation of Ser. No. 599,372, Dec. 6, 1966, abandoned.

[52] U.S. Cl. ............... 106/124, 106/135, 106/137, 106/148, 106/213, 106/214
[51] Int. Cl. ............................................. C08b 25/02
[58] Field of Search .................... 106/124, 148, 214

[56] References Cited
UNITED STATES PATENTS

| | | | |
|---|---|---|---|
| 1,434,227 | 10/1922 | Ryan | 106/148 |
| 3,034,859 | 5/1962 | Gunn et al. | 241/184 X |
| 1,320,666 | 11/1919 | Barteis | 106/148 |

*Primary Examiner*—Theodore Morris

[57] ABSTRACT

The disclosure relates to a process for preparing an adhesive, a novel adhesive, a novel polymeric material and a process for preparing extremely stable emulsions. The process of the invention comprises subjecting an aqueous mixture of starch or protein, or at least two insoluble substances, and grinding media to an agitation in the presence of a pigment, if desired, and then removing the grinding media therefrom. The treated starch or protein may be further reacted with a polymerizable monomer or preformed polymer to form the novel polymeric material. A superior adhesive, which finds particular application in coating base materials, as paper, is obtained. Stable emulsions formed are particularly useful in pharmaceutical and food applications.

20 Claims, No Drawings

ADHESIVE

CROSS-REFERENCES TO RELATED APPLICATIONS

This application is a continuation-in-part of pending application Ser. No. 817,258 now abandoned. Application Ser. No. 817,258, in turn, in a continuation application of application Ser. No. 599,372, now abandoned.

BACKGROUND OF THE INVENTION

1. Field of the Invention

The present invention is concerned with a novel adhesive, a novel pigment-adhesive coating composition, a novel process for preparing the adhesive and pigment-adhesive coating composition, and a base coated with the novel adhesive. More particularly, the present invention relates to a novel pigment-adhesive coating composition for paper, novel polymer and emulsification process.

2. Description of the Prior Art

Paper and other base material, as wood, are often coated with pigment-adhesive coating compositions to obtain products having a good brightness, color, gloss, appearance and printing properties.

The coating compositions are generally prepared by mixing an aqueous pigment slurry containing clay, titanium dioxide, calcium carbonate and/or other pigments with a conventional water-base adhesive or mixture of these adhesives, containing small amounts of additives as antifoam agents, bactericides, dispersing agents, etc., in order to obtain a smooth homogeneous mixture. The composition is then spread on paper or paperboard by any of a variety of methods. These include the use of an air doctor coater, roll coater, trailing blade coaters, and involve size press coatings, calender stack coatings, and water box applications.

The adhesives used in preparing the known adhesive coating compositions are generally water-base adhesives containing casein and other proteins, starches including hydroxyethylated starches, oxidized starches and other modified starches, polyvinyl alcohol or latices, e.g., a Dow 636 latex (a styrene-butadiene copolymer latex), a National Starch 1103 latex (a polyvinyl acetate latex), a Rohm & Haas B-15 latex (an acrylic resin latex), as well as combinations of these materials. Casein including modified caseins and other proteins, e.g., soya protein, and starches comprise the most commonly used adhesives in paper coating.

In forming the known adhesive coating compositions, it is common practice to heat or "cook" a protein or starch, usually in the presence of an alkali as ammonium hydroxide or sodium hydroxide, to prepare the protein or starch for use as an adhesive in a coating color or with a pigment. Enzymes are often added to starch slurries or to starch-pigment slurries. Cooking or the addition of enzymes tend to solubilize or form dispersions of starch and protein suitable for use in a coating color.

The prior art, such as Ryan Pat. No. 1,434,227 which issued on Oct. 31, 1922, discloses subjecting satin white, either in the dry or paste form, to the action of a pebble grinding mill run at such a rate that the pebbles flow down over each other and through the mixture. Bartels U.S. Pat. No. 1,320,666 which issued on Nov. 4, 1919, suggests subjecting casein moistened with water to a grinding action using rubbing or grinding devices, kneading machines or rolling mills. Gunn et al. U.S. Pat. No. 3,034,859, assigned to Freeport Sulphur Company, the owner of the instant application, discloses delaminating coarse English primary filler clays and English primary coating clays using rapid agitation of a slurry of the clay with fine, non-abrasive grinding media. Addition of casein, as an adhesive, to a clay slurry *subsequent* to the delamination of the clay is shown in the Gunn et al. patent.

SUMMARY OF THE INVENTION

It is an object of the invention to provide a novel adhesive composition, particularly a protein or starch composition, for bonding base materials.

It is also an object of the invention to provide a novel adhesive having a remarkable adhesive strength.

Another object of the invention is to provide a novel pigment-adhesive composition, particularly a novel pigment-protein or starch composition, having a remarkable adhesive strength.

Still another object of the invention is to provide a novel pigment-adhesive composition requiring a smaller amount of protein or starch, in comparison with conventional protein or starch adhesives, for producing a coating composition of a given strength.

Another object of the invention is to provide a coating composition which gives a coated product of superior gloss, brightness and opacity.

Yet another object of the invention is to provide an inexpensive process for producing a protein or starch adhesive composition through the elimination of a separate and expensive cooking step or enzyme treatment.

Still another object of the invention is to provide paper having good brightness and color, a high gloss and opacity, a pleasing appearance and a good printing property.

Another object of the invention is to provide an efficient and simple process for preparing stable emulsions of insoluble substances.

Yet another object of the invention is to enable the use of smaller amounts of adhesive in coating colors than is standard, thus insuring a good gloss, brightness and opacity and a better color of the coated product at a lower cost.

Another object of the invention is to produce a novel crosslinked polymeric material obtained by reacting the starch or protein, treated according to our invention, with a polymerizable monomer, or preformed polymer, reactive with the hydroxyl, aldehyde, ketonic or amino groups of the treated starch or protein.

Other objects and advantages of the invention will be apparent to those skilled in the art from the following description and examples.

We have found that the foregoing objectives are obtained by subjecting, in a batch or continuous operation, an aqueous mixture of a conventional protein or starch, or insoluble substances, to a vigorous agitation in the presence of fine grinding media, for a time sufficient to increase the adhesiveness of the protein or starch, or a time sufficient to form a stable emulsion, after which the grinding media is removed from the aqueous adhesive or emulsion by screening, centrifugation or other equivalent means. When producing our novel pigment-adhesive coating compositions, the pigment may be added subsequent to the grinding step.

Preferably it is added prior to the grinding step. When producing the novel crosslinked material, the monomer or preformed polymer is reacted with the treated starch or protein subsequent to the removal of the grinding media.

The terms "starch" and "protein" as used in the application include any water soluble or colloidal dispersible starch or protein, modified or unmodified. Starch or protein so treated by the process of our invention is termed "fine media milled starch" or "fine media milled protein."

Proteins are nitrogeneous organic compounds of molecular weight of about 34,000 to 200,000 that occur in vegetable and animal matter. Proteins are conventionally classified, in the United States, as (1) simple proteins, viz. substances that yield only alpha amino acids or their derivatives on hydrolysis, (2) conjugated proteins, viz. protein combined with another (prosthetic) substance, and (3) derived proteins, viz. primary and secondary split products of proteins. Examples of proteins are collagen, zein, animal glue, keratin and leather. Merely as illustrative proteins Australian casein and soya protein have been used in the examples. However, any protein, as such or modified, is applicable in the invention.

As disclosed in "Synthetic and Protein Adhesives for Paper Coating," Tappi Monograph Series No. 22 (1961), chapter VII, casein is obtained only from milk. Casein is more commonly purchased according to world origin, the sources as of 1961 for large shipments being Argentina, New Zealand, Australia, Uruguay, France, Norway, Holland and Poland. The term "Australian casein" merely refers to casein which has originated from Australia.

Starch is represented by the formula $(C_6H_{10}O_5)_x$ wherein $x$ is a large number with the molecular weight ranging from less than 10,000 to over one million. It has been defined as carbohydrates or polysaccharides which exist in many plant cells and serves as the chief carbohydrate reserve in the cells. Starch is said to consist of at least 2 fractions: (1) amylose or alpha amylose and (2) amylopectin or beta-amylose. Illustrative examples of starch are alant starch, allylstarch, animalstarch, cassavastarch, cornstarch, high amylose and amylopectin starches.

The grinding media employed in our process should be unreactive with the starch and protein or insoluble material under the processing conditions and not melt below about 90°C. The media can be of sand or beads, cylinders, pellets of a ceramic material or of a plastic. The use of sand has the disadvantage of having an abrasive action on the container used for the milling. This disadvantage can be eliminated through the use of a milling system where metal abrasion would not occur, e.g., a ceramic lined sand mill.

A ceramic is a term conventionally used in the art and defines a product composed of earthy substances which is made or used at temperatures above about 550°C. It is a generic term for all types of pottery, burnt clay products and glass.

Advantageously, the grinding media used in our invention has a specific gravity less than that of any pigment slurry used with the adhesive. Also, the grinding media should be smaller than one-half inch, preferably smaller than one-quarter inch, i.e., preferably smaller than about 3 mesh (Tyler) in overall diameter. The grinding media should also be larger than 400 mesh, advantageously larger than 200 mesh. Preferably the grinding media has a 10–60 mesh size.

It is advantageous that the grinding media be resistant to wear during milling and have a low specific gravity. In this environment, less power is required for the agitation.

When the grinding media is not larger than 400 mesh, there is difficulty in removing the media from the slurry. When the media is not smaller than one-half inch, there is not the marked improvement in gloss or in adhesiveness. Moreover, the facility in carrying out the process is greatly diminshed with such large grinding media, e.g., excess power is required in an attempt to obtain comparable results.

The grinding media generally comprise 30–70 volume percent of the total mixture, preferably around 50 volume percent of the total mixture.

Plastic is the preferred grinding media. The plastic of applicants' grinding media is the synthetic high molecular weight materials produced either by addition or condensation polymerization. An important class of plastics for the media are those obtained from a polymerizable monomer having a carbon-carbon double bond. Such polymers include the polyalkenes formed from monomers such as ethylene, propylene, and isobutylene; the polydialkenes formed from monomers such as butadiene and isoprene; the halogenated polyalkenes from monomers such as tetra chloroethylene and chlorotrifluoroethylene; the vinyl resins such as polyvinyl acetal, polyvinyl acetate, polyvinyl alcohol, polyvinyl butyral, polyvinyl carbazole, polyvinyl chloride and polyvinylidene chloride; the polystyrenes formed from such monomers as sytrene and alpha-methylstyrene; and the acrylic resins formed from such monomers as acrylic acid, methacrylic acid, methyl acrylate, ethyl acrylate, methyl methacrylate, ethyl methacrylate, and acrylonitrile.

Other applicable resins for the grinding media are the cellulose derivatives, e.g., cellulose esters such as cellulose acetate, cellulose triacetate, cellulose acetatebutyrate, and cellulose propionate, and cellulose ethers such as methyl or ethyl cellulose, cellulose nitrate, rayon, and the like.

Acetal resins form another group of suitable grinding media resins. This class comprises those resins formed by the addition polymerization of formaldehyde or higher aldehydes to produce an oxymethylene or substituted oxymethylene linkage.

Resins formed by the condensation of an aldehyde with other materials can also be used in applicants' process as the grinding media. Typical resins are the phenolics, formed by the condensation of phenol, cresol, xylenol, or other hydroxy aromatic compounds with formaldehyde or other higher aldehydes; the melamine resins, formed by the condensation of melamine and formaldehyde or higher aldehydes; and resins formed by the condensation of urea with formaldehyde or higher aldehydes.

Other applicable resins include the furan resins obtained by the polymerization of furfural or furfuryl alcohol, and by copolymerization of furfural and a ketone; coumarone-indene resins; silicone elastomers; polycarbonate resins formed by polymerization of unsaturated cyclic esters of carbonic acid such as vinylidene carbonate and allyldiglycol carbonate or by condensation of phosgene with a diol; epoxy resins formed by condensation of a halogenated alkylene oxide such as epichlorohydrin with a polyhydric compound such as ethylene glycol or bis-phenol.

A further class of suitable resins for the grinding media are the polyesters. These resins are formed by reaction of a polyhydric alcohol with a saturated or unsaturated polycarboxylic acid, acid anhydride, or acyl halide and include the polyesters formed from an unsaturated acid and an alkylene glycol or dialkylene glycol, which product is subsequently crosslinked by further reaction with a compound containing

group such as styrene, ethyl acrylate, methyl methacrylate, acrylonitrile, vinyl acetate, or acrolein.

Another class of resins are the polyurethane resins prepared by reaction of polyols, polyesters, or polyethers with a polyisocyanate such as tolylenediisocyanate. Other suitable resins for the grinding media are the polyamides produced by the condensation of a diamine with a dicarboxylic acid, or by the addition polymerization of cyclic amides, or by some other method. The polyamides include the nylons, such as nylon 6 (from espilon-caprolactam) and nylon 66 (from hexamethylenediamine and adipic acid).

Another related group of resins include the copolymers and terpolymers of the above groups. Examples include polymerized butadiene/styrene, vinyl chloride/vinyl acetate, vinyl chloride/vinyloxythanol, ethylene/maleic anhydride, butadiene/styrene/vinylbenzene, and styrene/epoxide/maleia anhydride.

Preferred plastics for the grinding media are nylon, styrene-divinyl benzene copolymers, polystyrene, polyvinyl chloride, polyethylene, polypropylene and ABS (acrylonitrile-butadiene-styrene terpolymer).

Various pigments can be employed in our process. Illustrative pigments include clays, delaminated clays, mica, zinc oxide, titanium dioxide, satin white and other pigments conventionally used today by the paper industry in treating paper. It is essential that the particle size of the pigments be less than 50 microns in equivalent spherical diameter and preferably less than about 15 microns in spherical diameter. The pigment furthermore should contain a major portion of its particles below 5 microns, preferably below 2 microns, in equivalent spherical diameter. The amounts of pigment, when employed, will vary depending on what effect is desired on the base material.

The degree of agitation to be employed in our process will vary widely depending upon the size and shape of the milling container and also upon the type of agitating device, e.g., the design and pitch of the blades. The agitation also may be carried out by stirring, tumbling, shaking, rocking and the like.

The base material that may be treated with the adhesive or adhesive-pigment composition includes any material that can be wetted by the adhesive or adhesive-pigment composition, e.g. metal or metal foil as aluminum foil, synthetic plastics, cellulose acetate, wood and paper. Paper is the preferred base, the term "paper" including paper of all weights and types, paperboard including Fourdrinier cylinder of other types, material coated with paper and the like.

In reacting the "fine media milled starch" or "fine media milled protein" with a polymerizable monomer, any monomer or preformed polymer reactive with the hydroxyl, aldehyde or ketonic groups of said starch, or with the amino or amido groups of said protein, and capable of forming crosslinked polymer with said starch or protein, can be used. Such materials include amino, substituted amino, amido and substituted amido vinyl monomers, e.g., acrylamide, methacrylamide and the substituted acrylamides and methacrylamides, carboxylic acid containing vinyl monomers, e.g., acrylic acid, alkyd resin components, e.g., dibasic acids such as adipic acid and alkylene glycols such as diethylene glycol, preformed resins as polymers containing acrylic acid or methacrylic acid. Polyester resins which are useful may be either the linear polyesters which are obtained by the reaction of one or more polyhydric alcohols with one or more alpha, beta unsaturated polycarboxylic acids alone or in combination with one or more saturated polycarboxylic acid compounds, or the crosslinked polyester resins which are obtained by reacting the linear polyester with a compound containing a

group. Polyhydric alcohols used are, e.g., ethylene glycol, diethylene glycol, propylene glycol, trimethylene glycol, trimethylolpropane, trimethylolethane, 1,4-butane-diol, 4,4'-isopropylidenediphenol, 4,4'-isopropylidenedicyclohexanol, hydroquinone, 1,2-dihydroxynaphthalene, 4,4'-dihydroxybiphenyl, 4,4'-(2-butylidene)-di-m-cresol, glycerol, pentaerythritol, mannitol, etc. The polycarboxylic acid compounds used are, e.g., the alpha, beta unsaturated acids or the anhydrides or acyl halides thereof, such as maleic acid, maleic anhydride, maleyl chloride, fumaric acid, itaconic acid, itaconoyl chloride, mesaconic acid, citraconic acid, etc.; the alkane-dicarboxylic acids, anhydrides or acyl halides thereof such as oxalic or malonic acid, anhydride or acyl halide, succinic acid, anhydride or halide; adipic acid, acyl halide or anhydride and sebacic acid, acyl halide or anhydride; the cycloparaffin-dicarboxylic acids such as 1,2-cyclohexanedicarboxylic acid or its anhydride or acyl halide; the aromatic dicarboxylic acids such as phthalic, terephthalic or 1,2-naphthalenedicarboxylic acid or the anhydrides or acyl halides thereof, the halogenated dicarboxylic compounds such as dichloroterphthalic acid or 1,4,5,6,7,7-hexachlorobicyclo-(2,2,1)-5-heptene-2,3-dicarboxylic anhydride, etc.

The epoxy resins are another class of polymeric materials advantageously used with the fine media milled protein or fine media milled starch. These resins are condensation products formed by the reaction of a polyhydroxy compound and epichlorohydrin, which condensation products are subsequently cured by addition of cross-linking agents. The hydroxy compound may be any of the polyhydric compounds mentioned above as useful for the preparation of polyester resins; bisphenol, i.e., 4,4'-isopropylidenediphenol, is the commonly employed polyhydric compound. The cross-linking agent employed in the curing or hardening step may be a dicarboxylic compound such as phthalic anhydride or adipic acid, or a polyamine such as ethylene diamine, m- or p- phenylene diamine or, diethylenetriamine.

The polyurethanes comprise another class of polymeric materials which are useful with the fine media milled protein or fine media milled starch. Essentially the polyurethanes are condensation products of a diisocyanate and a compound having a molecular weight of at least 500 and preferably about 1,500–5,000, and at least two reactive hydrogen atoms, i.e., hydrogen atom; determinable by the Zerewitinoff method. The useful active-hydrogen containing compounds may be polyesters prepared from polycarboxylic acids and polyhydric alcohols, polyhydric polyalkylene esters having at least two hydroxyl groups, polythioether glycols, polyesteramides, etc. The polyesters used for the production of the polyurethane may be branched and/or linear. Thus, the useful polyesters and/or polyesteramides may include those obtained by condensing any polybasic (preferably dibasic carboxylic) organic acid, such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, furmaric, itaconic, etc., with polyalcohols such as ethylene glycol, diethylene glycol, pentaglycol, glycerol, sorbitol, triethanolamine, di-(beta-hydroxyethyl) ether, etc. and/or amino-alcohols such as ethanolamine. The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc. The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, and 1,5-naphthalene diisocyanate, etc. In practice, the polyurethane plastics are produced by bringing together the organic compound which contains at least two reactive hydrogen atoms and is capable of forming polyurethanes, with the polyisocyanate and an activator mixture. The latter is made up of at least one cross-linking agent and/or an accelerator and may contain, if desired, added water or an aqueous solution.

Phenolic resins useful are, for example, the phenolaldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts.

The aminoplasts comprise another group of aldehyde resins which are useful with the fine media milled starch or fine media milled protein. Examples of the aminoplasts are the heat-convertible condensation products of an aldehyde with urea, thiourea guanidine, cyanamide, dicyandiamide, alkyl or aryl guanamines, and the triazines such as melamine, 2-chloro-4,6-diamino-1,3,5-triazine and 2-hydroxy-4,6-diamino, 1,3,5-triazines. The aminoplasts may be prepared by using various aldehydes instead of formaldehyde; e.g., there may be used acetaldehyde, propionaldehyde, furfural, glyoxal and the like.

The nylons useful with the fine media milled starch or fine media milled protein are, e.g., the superpolyamides which are generally obtained by the condensation of a diamine, e.g., hexamethylenediamine with a dicarboxylic acid, e.g., adipic acid. Other polyamides useful are the polypeptides which may be prepared, e.g., by the condensation reaction of an N-carboalkoxy substituted or an N-acyl substituted alpha-amino carboxylic acid with the same or different unsubstituted amino carboxylic acid, e.g., by reaction of N-carbobenzyloxyglycine with glycine or a mixture of glycine and lysine, or an N-carboxy amino acid anhydride such as N-carboxy-DL-phenylalanine anhydride. Still another class of polyamides useful are the polymeric lactams, e.g., polycaprolactam, pipcridone, 2-oxohexamethyleneimine and other cyclic amides.

In forming the novel polymeric material by our novel process, conventional graft polymerization conditions can be used, e.g., emulsion, solution or suspension polymerization reaction conditions using free radical or condensation catalysts. Proportions of reactants are not critical.

It has been found that the reaction rate of the polymerizable material or performed polymer with a starch or protein is particularly enhanced when the starch is converted to a fine media milled starch or fine media milled protein. For example, disadvantages existing in reacting a solid material with a liquid are eliminated, the fine media milled starch or fine media milled protein allowing for instantaneous reaction and intimate contact with the polymerizable material or preformed polymer.

Fine media milled starch or fine media milled protein further modified with polymerizable or polymeric materials yield coated sheets having an excellent wet rub resistance and improved adhesive characteristics. Latices, conventionally used in coatings, can be eliminated, thus cutting down the costs. The novel polymeric materials in addition can be used in moldings or as fillers. They find particular application in the insulating field and other regions where cross-linked materials are useful.

In another embodiment of our invention, extremely stable emulsions, viz., dispersions wherein the particles may vary from about 500 to 5,000 angstroms, are obtained by subjecting, in a batch or continuous operation, dispersions of two or more materials, two materials of which are insoluble with one another, to a vigorous agitation in the presence of grinding media, as defined supra, and conventional nonionic, anionic or cationic emulsifiers, for a time sufficient to form said stable emulsions. The degree of agitation again can vary widely depending upon the size and shape of the milling container and also upon the type of agitating device. The exact time for agitation will depend upon the materials being emulsified.

The insoluble materials useful in our novel emulsification process cover a wide variety of materials conventionally employed in the emulsion art. Thus, for example, stable aqueous emulsions of dispersed fats, oils, synthetic and natural polymers, and foodstuffs are prepared by dispersing the respective material in water, adding emulsifiers as desired, and subjecting the dispersion to agitation in the presence of our grinding media. Oils such as hydrocarbons can be readily emulsified in water or water emulsified in oils to form stable emulsions by our process.

The stable emulsions of our invention find particular utility in the pharmaceutical and food application fields where emulsions have been commonly used.

Our emulsification process is extremely efficient for forming a substantially permanent mixture of two or more materials which do not normally dissolve in each other. Mayonnaise and such pharmaceutical preparations as cod-liver oil emulsion or liquid petrolatum emulsion are ready formed by our process.

Typical emulsifiers in our process are egg yolk, casein, and certain other proteins; soap; gums such as acacia, algin, Irish moss, water-soluble cellulose derivatives; lignin, bentonite, and surface-active agents such as the quaternary ammonium compounds, sulfonated oils, and polyhydric alcohol esters and ethers. Specific kinds of soaps include those from tallow, grease, fish oil, rosin acids, mahogany soaps, i.e., the sodium salts of sulfonic acids from petroleum refining sludge, sorbitan oleates and laurates, and polyoxyethylene esters. Stearic acid esters of glycerin, ethylene oxide, sorbitol, and glycols, and also lecithin are also suitable, as well as ammonium and amine fatty acid soaps.

The following examples are given to aid in understanding the invention. It is to be understood that the invention is not restricted to the specific compositions or conditions given in the examples. Said examples are rather only illustrative and should not be construed as limiting the invention which is properly delineated in the appended claims.

Example 1 a. A slurry was prepared which contained 600 g. clay, 99 g. of Australian Casein, 5.94 g. sodium hydroxide, 1.0 g. tetrasodium pyrophosphate, 1,000 g. of 1/10 × 1/10 inch dia. nylon cylinders and enough water to give 35 percent solids (based on clay and casein). The clay used was a coarse filler grade of clay having about 25 percent of its particles below two microns in equivalent spherical diameter. Such a clay is generally considered unsuitable for coating compositions.

The slurry was placed in a 1 gallon plastic container and agitated for 3 hours by means of a stirrer operating at about 1,600 RPM. After this treatment, the nylon pellets were removed by screening the mixture through an 80 mesh screen. The coating color so obtained was used to coat paper sheets. The following Table I (sample B) shows the results obtained. Sheets were coated on one side by applying, through use of a blade coater, 13 pounds (air dry basis) of coating per 3,300 ft.$^2$ on a 54 pound per ream paper raw stock. The coated sheets were air dried at constant temperature and constant humidity (73° F., 50% R.H.) before being tested and calendered. The conditioned sheets were calendered 8 nips at 1,600 pounds per lineal inch (pli) pressure through use of a three roll (steel-cotton-steel) calender stack.

b. For comparative purposes a conventional coating was prepared by heating a 16 percent solids slurry of casein (17 parts), sodium hydroxide (one part), and ammonium hydroxide (1.8 parts—added as a 28 percent solution) at 70°C. for 20 minutes, until the casein had been solubilized. The casein solution was then mixed carefully with a previously prepared, dispersed slurry of the coarse filler clay (100 parts) used in Example 1 a. Final solids of the coating colors was 35 percent. The resulting coating color was then homogenized, carefully screened, and used to coat paper sheets as described in Example 1 a. The results obtained are shown in the following Table I (sample A).

c. Another paper coating color was prepared in the conventional manner, as just described, but a commercial paper coating clay (Columbia Coating Clay—Freeport Kaolin Company—a commercial paper coating clay having 80 percent of its particles finer than 2 microns) was used in place of the coarse filler clay. Data obtained on paper coated with this coating color are listed in the following Table I (sample C).

d. A coating color was prepared as described in Example 1 a except that a No. 2 grade coating clay (Columbia Coating Clay—Freeport Kaolin Company) was substituted for the coarse filler clay. The results obtained from use of this coating color are shown in the following Table I, (sample D). Sample C, in Table I, shows the results obtained when a coating color of the same composition, but prepared by conventional means, is used.

TABLE I

| Sample | Calendered Sheet Properties | |
|---|---|---|
| | Gloss** | G. E.* |
| A | 35.5 | 69.8 |
| B | 67 | 74.3 |
| C | 57 | 74.0 |
| D | 71 | 75.0 |

*"G.E." brightness values are determined according to standard TAPPI (Technical Association of the Pulp and Paper Industry) Method T646 m-54, as reported in the Testing Methods-Recommended Practices-Specifications of the Technical Association of the Pulp and Paper Industry.
**Gloss values are determined according to TAPPI specification T480 ts-65, entitled "Specular Gloss of Paper and Paperboard at 75°."

It can be seen from a comparison of the above data for samples A and B that the new process for preparing coating colors gave a gloss improvement of better than 30 points and a 4.5 point improvement in G.E. brightness over a coating color prepared with a coarse filler by conventional means. Furthermore, a comparison of the above data for samples C and D shows that the coating color prepared by the new process gave results superior to a coating color prepared in the conventional manner using a standard No. 2 grade of coating clay (sample C). By use of the new process, a coating color prepared using a cheap filler clay has been found to give results better than those obtained when a more expensive coating clay prepared in the conventional manner, is used. Furthermore, the new process does not require the expense of separate solubilization of the adhesive and the cost of separate mixing and milling to blend properly the adhesive and pigment.

Example 2

In order to demonstrate the effect of the new process on the adhesive portion of a coating color, the following experiment was performed. An 18 percent solids casein slurry was prepared by suspending 285 g. of Australian casein and 17.1 g. of sodium hydroxide in 1,300 g. of water. Nylon pellets (755 g.—1/10 inch dia. × 1/10 inch) were then added and the mixture was agitated for three hours through use of a stirrer operating at about 1,600 RPM. The nylon pellets were than removed by screening and the casein dispersion was mixed with a previously prepared, delaminated clay slurry. The coating color so obtained was used to coat paper sheets as described in Example 1 (a) and the data determined on these sheets are shown in the following Table II (sample B). A control coating color was prepared by conventional means, using the same ratio of casein and clay starting materials, and the results obtained on paper coated with the composition are shown in Table II (sample A). The delaminated clay used in both preparations in a commercial product produced by Freeport Kaolin Company and is sold under the name NUCLAY.

TABLE II

| Sample | Calendered Sheet Properties | |
|---|---|---|
| | Gloss | G.E. |
| A | 60 | 77.8 |
| B | 71 | 78.5 |

The data indicate the treatment of the adhesive gives a coating color with an 11 point gloss improvement and one point improvement in sheet brightness over the best values obtainable by conventional means. In addition, a reduction in coating color viscosity was obtained. This is an important factor to many papermakers.

Example 3 a. A slurry was prepared which contained 100 g. of starch (Tex-O-Film No. 6088—Corn Products Co.), 1.5 g. of tetrasodium pyrophosphate, 500 g. of a No. 1 grade coating clay (LUSTRA-Freeport Kaolin Company), 6 g. of Nopco C-104 (Nopco Chemical Co.—a calcium stearate preparation, used as a calendering aid), 1 g. Nopco 1497 (an anti-foam agent—a mixture of hydrocarbons and fatty materials), 1,436 g. of styrene-divinylbenzene copolymer beads (10–56 mesh, obtained from Dow Chemical Co), and 970 g. of water. Starch (usually derived from corn, but also sometimes obtained from potatoes, wheat, sorgum, milo or other sources) is used extensively as an adhesive in paper coating colors. The mixture was stirred for 1 hour and 20 minutes and was then screened through 80 and 200 mesh screens to remove the plastic beads. The pH of the coating color was adjusted to 8 with sodium hydroxide and was then used to coat paper, as previously described. Data determined on the coated paper are shown in following Table III (sample B). A control coating color was prepared by conventional means, using exactly the same amount and type of ingredients. The starch was first suspended in water (at 25 percent solids) and cooked for 30 minutes at 95–96°C. The dispersion was then added to a slurry containing the other ingredients and the mixture was used to coat the paper. Results are shown in the following Table III (sample A).

b. A coating color was prepared using the procedure given in Example 3 a, but only one half the amount of starch (50 g. instead of 100 g.) was used. The results are given in the following Table III (sample C).

TABLE III

| Sample | Calendered Sheet Properties | | |
|---|---|---|---|
| | Gloss | G.E. | Wax Pick |
| A | 65 | 73.6 | 9 |
| B | 41 | 67.8 | 19 |
| C | 75 | 75.0 | 8 |

The startling improvement in bonding strength of the coating to the paper substrate is indicated by the increase in the Dennison Wax Pick value from 9 to 19. The Dennison "wax pick" value, determined according to TAPPI (Technical Association of the Pulp and Paper Industry) Method T459 m-48, is conventionally employed to indicate the strength of the bond of a coating to a surface.

It also can be seen from Table III that use of the process of the invention in preparing the starch coating color has allowed the amount of adhesive required to be cut almost in half. Since adhesive costs represents the greater part of the cost of a coating color, very marked economics result from use of the present process. Savings in capital, equipment and in labor costs occur since the expensive steps of cooking the starch separately, followed by mixing and milling with the rest of the coating color components, can be avoided through use of the new process. Of even greater importance is the high gloss and improved sheet brightness that can be obtained through use of the new process. A 10 point increase in gloss and a 1.5 point improvement in brightness over that obtained with a coating color prepared conventionally from a No. 1 grade coating clay is most unexpected.

Example 4

Another coating color was prepared in a manner similar to that described in Example 3 a, except that only 67.5 g. (13.5 parts per 100 parts clay) of No. 6088 starch was used. The mixture was stirred for 1¼ hours at 3,700 RPM and the plastic beads were then removed by screening as previously described. Data determined on sheets coated with the resulting coating color are shown in the following Table IV (sample D). Table IV (sample E) also shows the results when a coating color prepared in the conventional manner, from similar types of ingredients but using 100 g. (20 parts per 100 parts clay) of starch, was used to coat paper.

TABLE IV

| Sample | Calendered Sheet Properties | | |
|---|---|---|---|
| | Gloss | G.E. | Wax Pick |
| D | 78.5 | 74.0 | 9 |
| E | 63.6 | 73.9 | 9 |

This Example confirms the results of Example 3.

Example 5 a. A slurry was prepared which contained soya protein (Adpro-Archer-Daniels-Midland Co.) 20 parts, 100 parts of PXCD (a synthetic calcium aluminum phosphate pigment—Freeport Kaolin Company), 3.0 parts of 28 percent ammonium hydroxide, 8.0 parts of Tamol 850 (a sodium salt of a polymeric carboxylic acid), 2.4 parts of urea, 232.5 parts of water and 303 parts of styrene-divinylbenzene copolymer beads (10–56 mesh—Dow Chemical Co.). The mixture was stirred for 1 hour, using a stirrer turning at 3,700 RPM. The mixture was then screened through 80 and 200 mesh screens to remove the plastic beads and the coating color was used to coat paper sheets. Data determined on the sheets are given in the following Table V (sample B). Sample A of Table V gives data determined on sheets coated with a coating color of similar composition, but prepared by conventional means, i.e., the protein was cooked separately (for 20 min. at 60° C.) and then blended with rest of the coating color ingredients.

b. A slurry was prepared which contained 16 parts Australian casein, 100 parts of PXCD, 8 parts Tamol 850, 3 parts ammonium hydroxide, 3 parts Azite 900 (dicyanodiamide), 225 parts of water and 290 parts of styrene-divinyl-benzene copolymer beads (10–54 mesh). The mixture was agitated for 1 hour as described in Example 5 a and the beads were then removed by screening. Data determined on paper coated with the resulting coating color are shown in Table V (sample D) and are compared to the data obtained from sheets coated with a coating color of composition similar to that above, but prepared by conventional means (i.e., the casein was cooked for 20 min. at 70° C. then mixed with the other ingredients) (sample C) Table V.

TABLE V

| Sample | | Calendered Sheet Properties | | |
|---|---|---|---|---|
| | | Gloss | G.E. | Wax Pick |
| A | Control for Ex. 5a (Soya protein) | 22.5 | 84.2 | 7 |
| B | Product from Ex. 5a (Soya protein) | 40 | 83.9 | 10 |
| C | Control for Ex. 5b (Casein) | 29 | 86.3 | <3 |
| D | Product from Ex. 5b (Casein) | 54 | 86 | 8 |

An increase in gloss can be noted in sample B over sample A but the improved coating—substrate bond, indicated by the change in wax pick from 7 to 10 is of particular importance. A very marked improvement in coating substrate bond is indicated in sample D over sample C by the change in wax pick from less than 3 for the control, to a value of 8 for the treated sample.

Example 6

A coating color was prepared in a manner similar to that in Example I a except that an ultra-fine grade of clay was used (KB Clay—Freeport Kaolin Co.) and a weight ratio of 5 parts of sand (5040 brand—Ottawa Silica Co.) per 3 parts of clay was used instead of the nylon pellets. The brightness of a paper sheet coated with this coating color was 78.6, compared to the sheet brightness of 77.5, obtained when the paper was coated with a control coating color of similar composition, but prepared by conventional means.

Example 7 a. A pearl starch adhesive was converted by mixing the following formula with rapid agitation for 2 hours. The final temperature of the mixture was 88° C. The beads were removed from the converted starch solution by screening.

Formula 1,500 gm. styrene-divinyl benzene copolymer beads 1,200 gm. water
300 gm. pearl starch
3 gm. sodium carbonate b. A second sample of pearl starch adhesive, used as a control for the above sample, was enzyme converted with 0.02 percent of an enzyme, Vanzyme No. 31, R. T. Vanderbilt Co., Inc., New York, N.Y. at 20 percent solids. The formula for this mixture was as follows:

Formula 1,200.0 gm. water
300.0 gm. pearl starch
3.0 gm. sodium carbonate
0.06 gm. Vanzyme No. 30

The above mixture was held at 170° F. for 20 min. then at 200° F. for 10 minutes to deactivate the enzyme.

The above described adhesives were at the same percent solids and at approximately the same consistency.

The adhesives were used to bond wood to wood samples together and allowed to cure or dry under constant pressure and temperature for 12 hours prior to testing.

Wood-adhesive-wood samples from both of the above described starch adhesives were tested on a Dillon Model L.W. Tester designed for bond or strength tests (W. C. Dillon Co., Inc., Van Nuys, California) and the results are shown in the following Table VI:

TABLE VI

| | | lbs./in.$^2$ required to pull blocks apart |
|---|---|---|
| a. | styrene-divinyl benzene copolymer treated starch | 52.7 |
| b. | enzyme converted starch | 49.3 |

Example 8 (outside our invention)

A slurry was prepared containing 625 g. of a No. 1 grade coating clay (Lustra — Freepolt Kaolin Company) 125 g. of starch (Tex-O-Film — Corn Product Co.), 7.5 g. of Nopco C-104 (Nopco Chemical Co. — a calcium stearate preparation, used as a calendering aid), 1.25 g. of Nopco 1497V, an anti-foaming agent, 1,213 g. water and 692 g. of a finely divided (ca. 95 percent finer than 40 microns which is equivalent to a 400 mesh designation, Tyler or U.S. ASTM E-11-61, 50 percent finer than 10 microns) low-density polyethylene pellets (Microthene FN300 — U.S.I. Chemicals). The mixture was agitated and otherwise treated as in Example 3. Upon completion of the agitation period, attempts were made to remove the plastic pellets by screening, but the pellets could not be removed, even using a 325 mesh screen. Unsuccessful attempts were also made to remove the pellets by diluting the mixture and attempting to remove the pellets by allowing them to float.

Example 9

A slurry identical in composition to that given in Example 8 was prepared, except that 6 mesh size polyethylene cubes were used as the milling media. The media were removed by screening after the milling step was complete and the coating color was used to coat a 54 lb./ream standard paper. The coated sheet after calendering, had a 72.5 Bausch & Lomb gloss value, a 77.0 G.E. brightness and gave an 8.0 Dennison wax pick value. A coating color with the same composition was prepared in the conventional way (by cooking the starch) and the standard paper, coated with the coating color so prepared (after calendering) had a 73.4 Bausch & Lomb gloss, a 75.5 G.E. brightness and gave a 9.0 Dennison wax pick value.

Example 10

A slurry identical in composition to that given in Example 8 was prepared, except that around 7 mesh size acrylonitrile-butadiene-styrene (ABS — from Marbon Chemical Corporation) cubes were used as the milling media. After milling and screening to remove the milling media, a standard paper was coated with the resulting coating color and the calendered sheet was found to have a 79.3 Bausch & Lomb gloss, a G.E. brightness of 75.4 and a Dennison wax pick of 9.0. Also, a coating color with the same composition was prepared in the conventional way (by cooking the starch) and the standard paper, coated with the coating color so prepared (after calendering) had a 73.4 Bausch & Lomb gloss, a 75.5 G.E. brightness and gave a 9.0 Dennison wax pick value.

Example 11

A slurry identical in composition to that given in Example 8 was prepared, except that around 8 mesh polypropylene (No. 5860 polypropylene — Shell Chemical Co.) was used as the milling media. A standard paper coated with the milled product gave a calendered Bausch & Lomb gloss value of 79.3 and a G.E. brightness of 75.1. A coating color with the same composition was prepared in the conventional way (by cooking the starch) and the standard paper, coated with the coating color so prepared (after calendering) had a 73.4 Bausch & Lomb gloss, a 75.5 G.E. brightness and gave a 9.0 Dennison wax pick value.

Example 12 a. Fifty percent by volume of 18 to 56 mesh styrene-divinyl benzene copolymer beads containing about 8 percent polymerized styrene and a 10 percent aqueous starch (Globe 3372) solution (3 liters of beads to 3 liters of the 10 percent aqueous starch solution) was milled in a standard New Brunswick Scientific Company Model F-14 Fermenter (Cat. No. 56852) for 1 hour at 2,350 R.P.M. The final temperature of the mixture was 51.5°C. The beads were removed from the aqueous starch solution by screening. The bead-free starch solution, when examined under a microscope, was found to be particulate-free.

b. The following reaction mixture was subjected to agitation at a temperature of about 23 to 40°C., under a nitrogen atmosphere and for not more than 1 hour and 40 minutes:

| | |
|---|---|
| 4 liters of particulate-free starch solution of Example 12 a. | = 218 g. (dry) |
| Acrylamide monomer (CH$_2$CH CONH$_2$) | = 112 g. |
| Ceric ammonium nitrate (catalyst) | = 14.3 g. |
| 1 normal HNO$_3$ (to dissolve catalyst) | = 50.0 ml. |

The reaction mixture so produced was then diluted with about 2 quarts of methanol and allowed to stand overnight. Five liters of the slurry was then added slowly, with agitation, to 5 liters of methanol. The mixture was then filtered to remove the solvent from the solid end product. The end product was then twice washed by re-suspending it in methanol and filtering. The product, a polymer of starch and acrylamide, contained 25.4 percent of polymerized acrylamide. Extraction of the product with methanol showed less than 3 percent of acrylamide homopolymer present in the product after the above reactions.

The product produced was used to prepare a paper coating color (20 parts of adhesive product with 100 parts of a No. 1 coated clay) which was used to coat a standard paper. The coated, calendered sheet had a 75.8 G.E. brightness, a 49.4 Bausch & Lomb gloss value and a 12.0 Dennison wax pick. The coated sheet showed an excelent wet rub resistance value when tested by a modification of the TAPPI RC-185 test procedure (excellent wet rub resistance after 5 minutes soaking time) whereas a conventional sheet coated with a starch containing coating color gave poor results after a two minute soaking period. A wax pick value of 12.0 as compared to a wax pick value of 9.0 for the control indicates that a marked improvement in adhesiveness was also obtained.

Example 13

To 1,000 ml. of a 40 mesh sand in a 1 gallon plastic container was added 2 liters of a 10 percent solids aqueous slurry of Tex-O-Film 6588 starch (Corn Products Co.). The mixture was then agitated, using a stainless steel impeller at 2,500 RPM for 22 minutes (final temperature was 62°C). The sand was then removed by screening and a portion of the starch slurry was used to prepare a paper coating color, using 20 parts starch (dry basis) to 100 parts of a No. 1 coating clay (Lustra — Freeport Kaolin Co.) — appropriate amounts of calendering aids and antifoam agents being added. A standard sheet was then coated with the mixture. The sheet, after calendering, had a 70.5 G.E. brightness, and had a Dennison wax pick of 8.5. A sheet coated with a coating color of similar composition, but prepared in the conventional way, by cooking, had a G.E. brightness of 73.4 and a wax pick value of 8.0.

Example 14

To 1,000 ml. of 40 mesh sand in a one gallon plastic container was added 1,200 ml. water and 1.955 g. 42°Be sodium silicate. The mixture was agitated for two minutes at 500 R.P.M. in order to thoroughly wet the same. To the above mixture was added 800 ml. of Mazola Corn Oil (a vegetable oil produced by Best Foods Div., Corn Products Co.) while continuing agitation at 500 R.P.M. Twenty-four grams of BRIJ 30 H.L.B. 9.5 (Atlas Powder Co., Wilmington, Del.) and 12 g. of Renex 30 H.L.B. 4.5 (Atlas Chemical Industries, Inc., Wilmington, Del.) surface active agents were added slowly to the above mixture and agitation at 2,000 R.P.M. was continued for 10 minutes. The mixture was screened to remove the sand and allowed to stand for 24 hours. A stable emulsion, with oil droplets between 0.1 and 16 microns, suitable in the food application field, was formed.

Example 15 a. A slurry was prepared which contained about 600 parts clay, about 99 parts of Australian casein, about 6 parts sodium hydroxide, about one part tetrasodium pyrophosphate and enough water to give about 35 percent solids (based on clay and casein). The clay used was a coarse filler grade clay having about 31 percent of its particles below two microns in equivalent spherical diameter. The aqueous slurry was then split in half. One portion (portion A) was subjected to a milling in a ball mill equipped with ½ inch diameter ceramic cylinders for about 3 hours. The ball mill was allowed to rotate horizontally at 72 rotations per minute causing the grinding media to undergo a tumbling action, and producing a friction between the ceramic cylinders which caused the clay to be broken down and dispersed. The other portion (portion B) was processed for about 3 hours according to Example 1 a, supra. After the respective processing, the ceramic cylinders and nylon pellets were removed by screening from the respective portions. The coating colors so obtained were used to coat paper sheets. Sheets were coated on one side by applying, through the use of a blade coater, about 13 pounds (air dry basis) of coating per 3,300 ft$^2$ on a 54 pound per ream paper raw stock. The coated sheets were air dried at constant temperature and constant humidity (73° F., 50% R.H.) before being tested and calendered. The conditioned sheets were calendered 8 nips at 1,600 pounds per lineal inch (pli) pressure through use of a three roll (steel-cotton-steel) calender stack.

For control, a formula was prepared by mixing untreated, coarse clay with conventional cooked casein solution in the same proportions as above. The following Table I shows the results obtained:

TABLE I

| Calendered sheet coated with portion A coating color (ball mill) | Calendered sheet coated with portion B coating color (our invention) | Control |
| --- | --- | --- |
| Gloss—55.3 | 65.8 | 36.9 |
| GE. Brightness—70.5 | 71.6 | 70.5 | b. (i) An approximately 18 percent solids casein slurry was prepared by suspending about 285 parts Australia casein and about 17 parts sodium hydroxide in about 1,300 parts water. One portion of this slurry was subjected to a milling in a ball mill equipped with ½ inch diameter ceramic cylinders for about 3 hours as in a. The cylinders were then removed by screening and the casein dispersion mixed with a previously prepared, delaminated clay slurry to form a portion C. The coating color so obtained was used to coat paper sheets as described in a above.

b. (ii) Equal portions of the 18 percent solids casein slurry were processed according to Example 2, supra, for about 3 hours and one-half hour respectively. The nylon pellets were then removed by screening and the casein dispersion mixed with a previously prepared delaminated clay slurry in the same amount as in b (i) to give portions G and D respectively. The coating color so obtained was used to coat paper sheets as described in a above.

The marked improvement in bonding power of the coating color from portions G and D in comparison with the bonding power of adhesive from portion C caused an increase in Dennison wax pick (14 for portion G and 13 for portion D as against 10 for portion C). A control gave a Dennison was pick of 9.

c. Experiments were repeated as described in b (i) and b (ii) but with the modification that the amount of casein in the coating color prepared according to our Example 2 process was reduced in comparison to that used with the ball mill process (12 parts casein per 100 parts of clay by our Example 2 process for ½ hour and for 15 minutes processing as against 16.5 parts casein per 100 parts clay by ball mill process for three hours processing as in a). Paper was coated with the respective coating colors. Results are shown in the following Table II.

TABLE II

| Calendered sheet coated with coating color (our Example 2 processing for one-half hour) (12 parts casein per 100 parts delaminated clay) | Calendered sheet coated with ball mill coating color (100 parts delaminated clay and 16.5 parts ball mill casein) |
| --- | --- |
| G.E. Brightness—80.1 | 77.5 |
| Gloss—78.3 | 75.1 |
| Calendered sheet coated with coating color (our Example 2 processing for one-half hour) (12 parts casein per 100 parts delaminated clay) | Calendered sheet coated with ball mill coating color (100 parts delaminated clay and 16.5 parts ball mill casein) |
| Calendered sheet coated with coating color (our Example 2 processing for 15 min.) (12 parts casein per 100 parts delaminated clay) | Control (100 parts delaminated clay and 16.5 parts conventional worked casein) |
| G.E.Brightness—80.2 | 78.2 |
| Gloss—84.6 | 72.5 |

Example 15 a shows that the processing of a coarse clay - casein mix according to our invention gave a 10 point higher sheet gloss and one point higher sheet brightness in comparison with a ball milling process for the clay-casein coating color at the same time interval (3 hours). Example 15 b shows, in comparing the ball mill process and our process on casein in the absence of a filler, that the coating color from our process when mixed with a delaminated clay caused a marked improvement in bonding power over the ball milled casin mixed with a delaminated clay. In comparison to a paper coating obtained by ball milling casein and then adding to the ball milled casein a delaminated clay, a paper coating of improved gloss and improved G.E. brightness was obtained with a smaller quantity of casein when the casein was treated according to our process and thereafter mixed with delaminated clay.

What is claimed is:

1. Process for preparing an adhesive composition which comprises subjecting an aqueous mixture of a starch or protein and grinding media, the grinding media comprising 30–70 volume percent of the total mixture, to an agitation, for a time sufficient to increase the adhesiveness of the protein or starch, said grinding media being smaller than one-half inch in overall diameter and larger than 400 mesh, and then removing the grinding media therefrom.

2. Process according to claim 1 wherein a pigment, having a particle size less than 50 microns in equivalent spherical diameter, is added to the adhesive composition subsequent to the removal of the grinding media.

3. An adhesive composition prepared by the process of claim 1.

4. An adhesive composition prepared by the process of claim 2.

5. Process for preparing a pigment-adhesive coating composition which comprises agitating an aqueous mixture of a starch or protein, pigment and grinding media, the grinding media comprising 30–70 volume percent of the total mixture, for a time sufficient to increase the adhesiveness of the protein or starch, and then removing the grinding media therefrom, said pigment having a particle size of less than 50 microns in spherical diameter, said grinding media being smaller than one-half inch in overall diameter and larger than 400 mesh.

6. Process according to claim 5 wherein the adhesive is casein and the pigment is clay.

7. An adhesive composition prepared by the process of claim 6.

8. Process for preparing a pigment-adhesive coating composition which comprises of agitating an aqueous mixture of starch, clay and grinding media, the grinding media comprising 30–70 volume percent of the total mixture, for a time sufficient to increase the adhesiveness of the starch, and then removing the grinding media therefrom, said pigment having a particle size of less than 50 microns in spherical diameter, said grinding media being smaller than one-half inch in overall diameter and larger than 400 mesh.

9. An adhesive composition prepared by the process of claim 8.

10. Process for preparing a pigment-adhesive coating composition which comprises of agitating an aqueous mixture of protein, clay and grinding media, the grinding media comprising 30–70 volume percent of the total mixture, for a time sufficient to increase the adhesiveness of the protein, and then removing the grinding media therefrom, said pigment having a particle size of less than 50 microns in spherical diameter, said grinding media being smaller than one-half inch in overall diameter and larger than 400 mesh.

11. An adhesive composition prepared by the process of claim 10.

12. A base material material containing a coating of a composition prepared by the process of claim 1.

13. A paper containing a coating of a composition prepared by the process of claim 5.

14. A paper containing a coating of a composition prepared by the process of claim 6.

15. A paper containing a coating of a composition prepared by the process of claim 8.

16. A paper containing a coating of a composition prepared by the process of claim 10.

17. Process for preparing an adhesive composition which comprises subjecting an aqueous mixture of a starch or protein and grinding media, the grinding media comprising 30–70 volume percent of the total mixture, to an agitation, for a time sufficient to increase the adhesiveness of the protein or starch, said grinding media being smaller than one-quarter inch in overall diameter and larger than 200 mesh, and then removing the griding media therefrom.

18. Process for preparing a pigment-adhesive coating composition which comprises agitating an aqueous mixture of a starch or protein, pigment and grinding media, the grinding media comprising 30–70 volume percent of the total mixture, for a time sufficient to increase the adhesiveness of the protein or starch, and then removing the grinding media therefrom, said pigment having a particle size of less than 50 microns in spherical diameter, said grinding media being smaller than one-quarter inch in overall diameter and larger than 200 mesh.

19. Process for preparing a pigment-adhesive coating composition which comprises agitating an aqueous mixture of starch, clay and grinding media, the grinding media comprising 30–70 volume percent of the total mixture, for a time sufficient to increase the adhesiveness of the starch, and then removing the grinding media therefrom, said pigment having a particle size of less than 50 microns in spherical diameter, said grinding media being smaller than one-quarter inch in overall diameter and larger than 200 mesh.

20. Process for preparing a pigment-adhesive coating composition which comprises agitating an aqueous mixture of protein, clay and grinding media, the grinding media comprising 30–70 volume percent of the total mixture, for a time sufficient to increase the adhesiveness of the protein, and then removing the grinding media therefrom, from, said pigment having a particle size of less than 50 microns in spherical diameter, said grinding media being smaller than one-quarter inch in overall diameter and larger than 200 mesh.

* * * * *

PO-1050
(5/69)

UNITED STATES PATENT OFFICE
CERTIFICATE OF CORRECTION

Patent No. 3,804,653    Dated April 16, 1974

Inventor(s) Horton Harold Morris, et al.

It is certified that error appears in the above-identified patent and that said Letters Patent are hereby corrected as shown below:

Column 1, line 8, "in" second occurrence should be -- is --;

Column 5, line 63, "of" should be -- or --;

Column 8, line 21, "performed" should be -- preformed --;

Column 9, line 30, "1/10" should be -- 1/10 inch --;

Column 16, line 8, "6588" should be -- 6488 --;

Column 17, line 14, "65,8" should be -- 65.8 --;

Column 17, line 45, "was" should be -- wax --;

Column 18, lines 1-7, delete lines 2-7, i.e., all the material between the first two horizontal lines in Column 18 and said two horizontal lines themselves;

Column 19, line 4, delete "of";

Column 19, line 16, delete "of".

Signed and sealed this 10th day of September 1974.

McCOY M. GIBSON, JR.
Attesting Officer

C. MARSHALL DANN
Commissioner of Patents